United States Patent
Ferrar et al.

(10) Patent No.: US 9,442,431 B2
(45) Date of Patent: Sep. 13, 2016

(54) INTERMEDIATE TRANSFER MEMBER, IMAGING APPARATUS, AND METHOD

(75) Inventors: Wayne Thomas Ferrar, Fairport, NY (US); Douglas Edward Garman, Webster, NY (US); Michel Frantz Molaire, Rochester, NY (US); Mark Cameron Zaretsky, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 474 days.

(21) Appl. No.: 13/332,418

(22) Filed: Dec. 21, 2011

(65) Prior Publication Data

US 2012/0171494 A1    Jul. 5, 2012

Related U.S. Application Data

(60) Provisional application No. 61/428,373, filed on Dec. 30, 2010.

(51) Int. Cl.
| | |
|---|---|
| B32B 9/04 | (2006.01) |
| G03G 15/01 | (2006.01) |
| G03G 15/16 | (2006.01) |
| B32B 27/04 | (2006.01) |
| B32B 27/28 | (2006.01) |
| B32B 27/36 | (2006.01) |

(52) U.S. Cl.
CPC ............... *G03G 15/161* (2013.01); *B32B 9/04* (2013.01); *B32B 27/04* (2013.01); *B32B 27/283* (2013.01); *B32B 27/36* (2013.01); *G03G 15/162* (2013.01); *B32B 2264/10* (2013.01); *B32B 2559/00* (2013.01); *Y10T 428/31504* (2015.04)

(58) Field of Classification Search
None
See application file for complete search history.

(56) References Cited

U.S. PATENT DOCUMENTS

| | | | |
|---|---|---|---|
| 5,084,735 A | 1/1992 | Rimai et al. | |
| 5,337,129 A | 8/1994 | Badesha | |
| 5,480,938 A | 1/1996 | Badesha | |
| 5,525,446 A | 6/1996 | Sypula et al. | |
| 5,689,787 A | 11/1997 | Tombs et al. | |
| 5,714,288 A | 2/1998 | Vreeland, II et al. | |
| 5,728,496 A | 3/1998 | Rimai et al. | |
| 5,741,616 A * | 4/1998 | Hirano et al. | 430/101 |

(Continued)

FOREIGN PATENT DOCUMENTS

| | | |
|---|---|---|
| EP | 0 747 785 | 2/2002 |
| JP | 2001262116 A * | 9/2001 |

(Continued)

OTHER PUBLICATIONS

JP 2001262116 English abstract (2001).*

(Continued)

*Primary Examiner* — Kenneth Stachel
(74) *Attorney, Agent, or Firm* — Andrew J. Anderson; Raymond L. Owens; J. Lanny Tucker

(57) ABSTRACT

An intermediate transfer member for electrophotography includes a substrate, a cured static dissipative silicone compliant layer comprising crosslinked silicone polymer formed from a UV light curable siloxane and a UV curing catalyst, and an outermost surface ceramer layer. This intermediate transfer member can be incorporated into a suitable imaging apparatus for forming a toned image on a receiver element.

8 Claims, 2 Drawing Sheets

(56) References Cited

U.S. PATENT DOCUMENTS

| | | |
|---|---|---|
| 5,968,656 A | 10/1999 | Ezenyilimba et al. |
| 5,985,419 A | 11/1999 | Schlueter, Jr. et al. |
| 6,548,154 B1 | 4/2003 | Stanton et al. |
| 6,694,120 B2 | 2/2004 | Ishii |
| 7,252,873 B2 | 8/2007 | Ferrar et al. |
| 2004/0247347 A1 | 12/2004 | Kuramoto et al. |

FOREIGN PATENT DOCUMENTS

| | | |
|---|---|---|
| WO | WO 2009152211 A1 * | 12/2009 |
| WO | WO 2010038767 A1 * | 4/2010 |

OTHER PUBLICATIONS

Soft Lithography Xia et al. 28,153-84 (1998).*

* cited by examiner

INTERMEDIATE TRANSFER MEMBER, IMAGING APPARATUS, AND METHOD

CROSS-REFERENCE TO RELATED APPLICATIONS

This application claims the benefit of U.S. Provisional Patent Application No. 61/428,373, filed Dec. 30, 2010, which is incorporated herein by reference in its entirety.

FIELD OF THE INVENTION

This invention relates to intermediate transfer members useful for electrophotography and electrophotographic imaging using a toner. Such intermediate transfer members can be incorporated into appropriate apparatus or devices used for such imaging. In particular, the invention relates to the use of a unique silicone conductive layer in the intermediate transfer members.

BACKGROUND OF THE INVENTION

The use of an intermediate transfer member in electrophotography has been known for many years. Such intermediate transfer members can be provided in the form of belts or drums, and can provide a number of advantages in electrophotographic imaging including simplified receiver element handling, single pass duplexing, reduced wear of photoconductors, and superposition of multiple images to form multicolor images. As multicolor electrophotography has developed in recent years, the toners applied and fixed for multicolor images have been reduced in size in order to improve image resolution. However, this has increased the difficulty in transferring toner efficiently and accurately.

In electrophotographic formation of multicolor images, a plurality of different color toners is used. These different color toners necessitate the formation of separate electrostatic latent images on the primary imaging member and the development of respective electrostatic latent images with the proper colored toner. For example, in full-process color methods, latent image separations and toner colors corresponding to the subtractive primary colors, cyan, magenta, yellow, and black, are used. These separations must ultimately be transferred to a receiver member in register in order to form the multi-color image reproduction.

In many multicolor electrostatographic or electrophotographic reproduction apparatus, transferring separate colors to a receiver member is accomplished by wrapping the receiver member around an electrically biasable drum. The electrostatic latent images, which have been formed on separate areas of the photoreceptor that correspond to the periodicity of the drum, are each rendered into visible images using the separately colored toner particles. These images are then transferred, in register, to the receiver member. This process, however, has a complicated receiver member path, as the receiver member must be picked up and held by the transfer drum and then released back to the transport mechanism at the appropriate time. This process can be simplified by first transferring all the separate images, in register, to an intermediate transfer member and then transferring the entire composite image to the receiver member. In either of these two modes of operation, the output speed of the electrostatographic reproduction apparatus is reduced due to the number of sequential transfers that need to be done.

In another example of color electrostatographic reproduction apparatus, it is desirable to separate the color separation image formation process into separate and substantially identical modules. This allows each colored image to be printed in parallel, thereby increasing the speed of the reproduction apparatus. In this process, the receiver member is transported from module to module and, while it can be picked up and wrapped around a transfer roller, there generally is no need to do so. It is also desirable to firstly transfer each image to an intermediate transfer member, such as a compliant transfer intermediate member as described in U.S. Pat. No. 5,084,735 (Rimai et al.). In order to reduce the time needed to produce a printed image, it is further desirable, however, that each color is produced in a separate module comprising a primary imaging member, development station, and transfer apparatus.

In all of these processes, it is necessary to transport the receiver member through the electrostatographic reproduction apparatus. One mode of transport uses a transport web such as a seamless transport web to which a receiver member can be attached electrostatically or by any other well known mechanism. When such a transport web is employed, in order to facilitate registration of individual developed images on a receiver member, it is desirable to drive the image forming modules using friction, especially in the case where separate modules are used for the formation, development, and transfer of individual color separation images. This requires that the web have a sufficiently high coefficient of friction during operation as described in U.S. Pat. No. 7,252,873 (Ferrar et al.). It also requires that the intermediate transfer member have a high coefficient of friction against the photoreceptor. Although many compositions can have sufficiently high frictional coefficients initially, the presence of fuser release agents on the receiver member transport web can reduce the friction with increased usage and result in slippage in a frictionally driven electrostatographic reproduction apparatus. This can result in image defects such as mis-registration and general overall unreliability of the reproduction apparatus.

In other reproductive methods, it is necessary that a high degree of slip exists between the different components of the printer. This allows for differences in speed between the photoreceptor, intermediate transfer member, and the receiver or transport member. A low coefficient of friction is desirable for these situations where the members pass each other at different rates but the color registration is not deleteriously affected by the drag of one surface on another.

An intermediate transfer member generally includes a substrate on which is formed a relatively thick, resilient blanket or compliant layer, and a thinner outermost surface layer on which toner is held. The compliant layer is generally composed of an elastomeric polymeric material such as a polyurethane that facilitates contact of toner particles with the member because of its desired deformation properties. The compliant layer can be electrically modified to enhance the electrostatic attraction of the toner particles. Since polyurethane compliant materials do not readily release toner particles, the relatively thin outermost surface layer (or "release" layer) is necessary for the member to be effective. It would be further desirable that the electrical conductivity of the intermediate transfer member be relatively independent of humidity conditions.

Several properties of the intermediate transfer member surface are especially important. Firstly, the surface energy should be sufficiently low to facilitate release of the fine toner particles. In addition, the intermediate transfer member surface should have good wear properties against the highly abrasive conditions of the transfer process. During the transfer, pressure is exerted on the toner particles at the first nip formed by a photoconductor and the intermediate transfer member. Even higher pressure is typically exerted at the second nip, where a receiver element, most often a paper sheet, is brought into contact with the toner particles on the intermediate transfer member surface. Residual toner particles are removed at a cleaning station that may include a blade, fur brush, or magnetic brush.

The outermost surface layer of the intermediate transfer member should also have sufficient flexibility to prevent cracking during the toner transfer process. The hardness of the substrate and compliant layer on which the outermost surface layer is disposed can vary over a considerable range, so it is necessary to adjust the flexibility of the outermost surface layer appropriately. This outermost surface layer is sufficiently thin or static dissipative to prevent its acting as an insulator against development of the field necessary for electrostatic attraction of the toner particles. It should also not work against the compliant layer properties.

In summary, it is important to control the surface energy, wear, electrical resistivity, humidity dependence, and flexibility properties of the intermediate transfer member. These properties can be evaluated by, respectively, contact angle measurements, abrasion test measurements, electrical resistivity, and storage modulus determination.

There are dozens of publications that describe various intermediate transfer member constructions and composition including, but not limited to, U.S. Pat. No. 5,084,735 (Rimai et al.), U.S. Pat. No. 5,337,129 (Badesha), U.S. Pat. No. 5,480,938 (Badesha et al.), U.S. Pat. No. 5,525,446 (Sypula et al.), U.S. Pat. No. 5,689,787 (Tombs et al.), U.S. Pat. No. 5,714,288 (Vreeland et al.), U.S. Pat. No. 5,728,496 (Rimai et al.), U.S. Pat. No. 5,985,419 (Schlueter, Jr. et al.), U.S. Pat. No. 6,548,154 (Stanton et al.), and U.S. Pat. No. 6,694,120 (Ishii), EP 0 747 785 (Kusaba et al.), and U.S. Patent Application Publication 2004/0247347 (Kuramoto et al.). In addition, U.S. Pat. No. 5,968,656 (Ezenyilimba et al.) describes intermediate transfer members having an outermost surface layer that includes a ceramer comprising a polyurethane silicate hybrid organic-inorganic network.

While the noted ceramer-containing intermediate transfer member has been used commercially and successfully for years, there is a need for improved intermediate transfer members.

SUMMARY OF THE INVENTION

The present invention provides an intermediate transfer member comprising:
a substrate,
a cured static dissipative silicone compliant layer comprising crosslinked silicone polymer formed from a UV light curable siloxane and a UV curing catalyst, and
an outermost surface ceramer layer.

This invention also provides an apparatus comprising:
a toner-image forming unit that uses a developer containing a toner to form a toner image on an image carrier, and
the intermediate transfer member of this invention.

In addition, a method of this invention for providing a toner image on a receiver element, comprises:
A) forming an electrostatic latent image on an image carrier,
B) developing the latent image with a dry developer comprising toner particles to form a toner image,
C) transferring the toner image to the intermediate transfer member of this invention, and
D) transferring the toner image from the intermediate transfer member to a receiver element, for example in the presence of an electric field that urges the movement of the toner image to the receiver element.

DETAILED DESCRIPTION OF THE INVENTION

Figure 1:
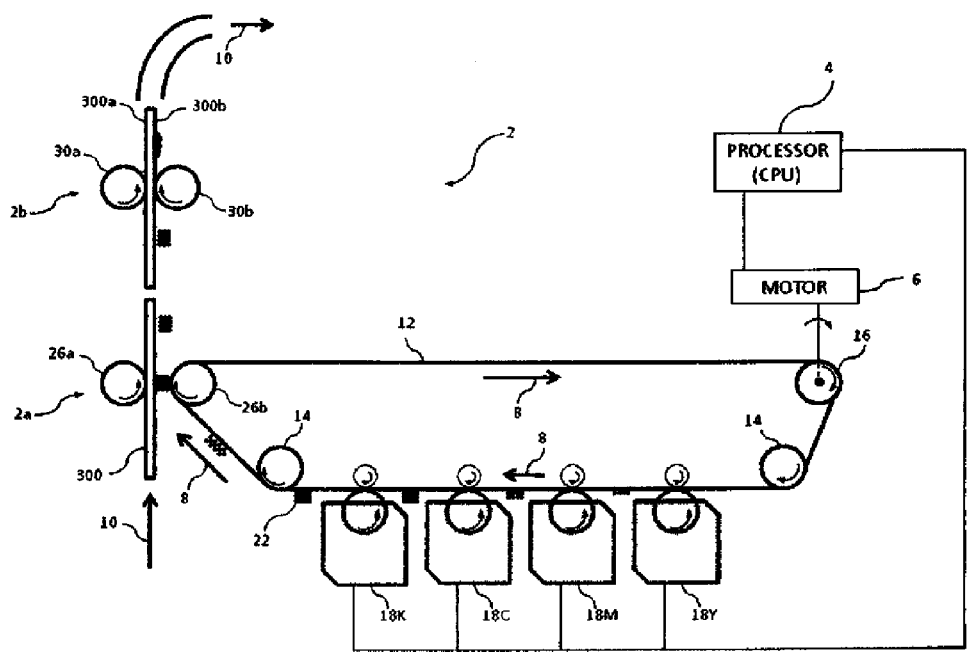
FIG. 1 is a schematic illustration of an electrostatic printing system in which an intermediate transfer member of the present invention is incorporated.

This invention describes UV curable siloxanes filled with conductive particles such as metal oxides, and in particular tin oxides, which are coated on conductive support to form compliant, humidity independent intermediate transfer layers for unfused toner images. In particular embodiments, liquid silicone ultra-violet (UV) curable polymers are mixed with electrically conductive (or static dissipative) tin oxides. Photoinitiators are added and the formulation coated upon a substrate which is subsequently exposed to UV irradiation. The polymers crosslink to imbibe the oxide while forming a solid layer that can be rolled up on itself without adhering to the layer above. Organic solvents such as tetrahydrofuran (THF) may be used to control the viscosity of the formulation. It is particularly advantageous that the levels and types of solvents required for the siloxane are not harmful to carbon filled poly(carbonate), one of the least expensive substrates that is inherently sensitive to many non-polar organic solvents. For example, urethane compliant layers are difficult to coat on polycarbonate due to attack on the substrate by the non-polar solvents necessary to coat the layer, which can render the coating unusable.

Cured compliant layers in accordance with the invention prepared by machine coating preferably have storage modulus levels between 1 and 30 MPa, and volume resistivity between 10E+8 and 10E+12 ohm-cm, more preferably 10E+9 and 10E+11 ohm-cm. The resistivity is independent of humidity due to the hydrophobic nature of the siloxanes employed, such as poly(dimethylsiloxane) PDMS. This allows facile transfer of toner to and from the intermediate transfer belt under a wide range of environmental conditions.

In a particular embodiment, epoxy functional silicones can be polymerized in the presence of conductive fillers using cationic photoinitiators. Multifunctional epoxycycylohexyl substituents on PDMS copolymers form layers that can be several hundred micrometers thick. The acid generating catalyst (p-isopropylphenyl)(p-methylphenyl)iodonium tetrakis(pentafluorophenyl) borate, commercially available from Gelest as catalog number OMBO037, is particularly useful for UV initiation of the epoxysilicones. It is believed that the high solubility of the catalyst in the silicones facilitates the efficient polymerization, including the formation of the reactive acid of the non-nucleophilic fluorosubstituted borate anion.

Conductive fillers are preferably added between 10 and 40 wt. %, more preferably 15 and 30 wt %, of the polymer. Acicular fillers are preferred as they can be used in lower amounts to achieve the percolation levels for static dissipation or charge migration through the non-polar siloxane layer. Antimony doped tin oxide acicular particles (FS-10P) and conductive tin oxide coated on titanium dioxide particles (FT-3000) from Ishihara from Japan both disperse well in the functionalized silicone prepolymers. Additionally the particles are white or gray in color and therefore have the added advantage of allowing the UV light to penetrate deeply into the coating for a more complete cure.

An overcoat layer is provided to improve the transfer efficiency of the toner. Overcoats that yield high quality images and have long life may be employed, preferably comprising a ceramer compositions providing a relatively high modulus ceramer overcoat that does not crack due to tension around a roller or going through a nip under pressure. Such ceramer overcoats may be as described, e.g., in U.S. Pat. No. 5,968,656 (Ezenyilimba et al., the disclosure of which is incorporated by reference herein. Such ceramer formulations coated on the silicone leads to a continuous coating, e.g., where ZONYL-FSN surfactant is added to spread the ceramer on the silicone. Fluorinated versions of the ceramer require less surfactant in the coating solution, producing an overcoat with superior adhesion to the silicone base layer, improved release properties due to low surface energy, and thus less tendency to crack. Filler particles may be used in the overcoat layer to modify the mechanical properties as well.

DEFINITIONS

As used herein, the term "ceramer" refers to a polyurethane silicate hybrid organic-inorganic network prepared by hydrolytic polymerization (sol-gel process) of a tetraalkoxysilane compound with alkoxysilane-containing organic moieties, which may be a trialkoxysilyl-terminated organic polymer. Further details of such materials are provided in CAS Change in Indexing Policy for Siloxanes (January 1995).

The term "fluoroceramer" refers to a material prepared similarly to a ceramer but reacting a fluorinated polyurethane having terminal alkoxysilane moieties with a tetraalkoxysilane compound.

Unless otherwise indicated, the terms "intermediate transfer member", "transfer member", or "member" refer to embodiments of this invention. Such intermediate transfer members can be "belts" as used in the Invention Examples described below.

The intermediate transfer member useful in an electrophotographic process has a substrate upon which one or more layers are disposed. This substrate can be in the form of a roller (drum) or endless belt (seamless or jointed belts). The presence of a compliant layer that is soft generally aids in the complete transfer of toner. For example, the compliant layer is a soft layer that helps prevent hollow character and improve transfer uniformity when toner is transferred onto a rough receiver substrate. Urethane polymers are often used as compliant layers because they can be both soft, with a low durometer, and tough, with high tear strength. Representative roller substrates are described for example in U.S. Pat. No. 5,968,656 (Ezenyilimba et al.) that is incorporated herein by reference. A roller can have a compliant layer on a rigid material such as an aluminum cylinder.

Suitable intermediate transfer belt substrates are often formed from a partially conductive or static dissipative thermoplastic such as polycarbonates and polyimides filled with carbon or a conductive polymer such as a polyaniline or polythiophene. While not necessary, a primer layer can be coated onto the substrate before a compliant layer is applied.

Other useful belt substrate compositions include polyamideimides, fluorinated resins such as poly(vinylidene fluoride) and poly(ethylene-co-tetrafluoroethylene), vinyl chloride-vinyl acetate copolymers, ABS resins, and poly(butylene terephthalate) and poly(ethylene terephthalate). Mixtures of the noted resins can also be used. These resins can also be blended with elastic materials and can also include other additives including antistatic agents. The belt or roller can be formulated to have a desired Young's modulus and other properties for a given apparatus and toner transfer process. Typically, an intermediate transfer member that is in the form of a belt will have an average total thickness of at least 75 μm and up to and including 1000 μm.

Such belts can have, for example, a length of at least 50 cm and up to and including 500 cm.

In one embodiments of this invention, the nanoparticle-containing ceramer or fluoroceramer composition is applied to a relatively soft UV cured crosslinked siloxane compliant layer. The relatively harder surface layer does not display a tendency to crack that is usually observed when a hard composition is disposed on a softer layer. Thus, the composition used in the present invention, with its high modulus (>100 MPa or MegaPascals) can be disposed on the low modulus (<50 MPa) compliant layer. This is particularly important for preparing flexible intermediate transfer members with good toner release characteristics.

The compliant layer disposed on the substrate provides some flexibility to the intermediate transfer member to conform to the irregularities encountered during electrostatic toner transfer. Typically, this compliant layer is elastomeric and has a Young's modulus of from about 1 MPa to about 100 MPa, or more likely from about 5 MPa to about 50 MPa, at the operating temperature of the intermediate transfer member (e.g., at 40° C.). This compliant layer generally has an average thickness of at least 50 μm and more likely at least 80 μm and up to and including 400 μm, or 500 μm, or 1000 μm.

Directly disposed on the compliant layer is the outermost surface layer (also known as an "overcoat"). In one embodiment, such outer layer may consist essentially of a non-particulate, non-fluorinated ceramer or fluoroceramer and nanosized inorganic particles. Thus, this outermost surface layer contains no other needed components for toner transfer and any additives (such as antioxidants, colorants, or lubricants) are optional. The outermost surface layer is generally transparent and has an average thickness, in dry form, of at least 1 and up to and including 20 μm, or typically at least 2 and up to and including 12 μm, or even at least 5 and up to 12 μm. The thickness ratio of the outermost surface layer to the intermediate compliant layer is typically at least 0.002:1 and up to and including 0.1:1.

The outermost surface layer generally has a Young's modulus that is much higher than that of the compliant layer at the operating temperature of the intermediate transfer member, and thus its Young's modulus is at least 50 MPa and up to and including 2000 MPa (e.g., at 40° C.). This Young's modulus does not appear to be affected by the presence of the nanosized inorganic particles. Surprisingly, ceramers and fluoroceramers having high amounts of alkoxysilane crosslinker and high amounts of nanosized inorganic particles do not readily crack under tensile stresses due to flexing. For example, fluoroceramer coatings prepared with tetraalkoxysilane as the crosslinker and nanosized fumed silica (about 30 weight %) dispersed therein did not crack after more than 5000 prints were prepared on an electrophotographic printing apparatus.

The outermost surface layer in certain embodiments has a measured storage modulus of at least 0.1 and up to and including 2 GPa, or typically at least 0.3 and up to and including 1.75 GPa, or still again at least 0.5 and up to and including 1.5 GPa, at the operating temperature of the intermediate transfer member (e.g., at 40° C.), when measured using a Dynamic Mechanical Analyzer (DMA).

In addition, the outermost surface layer in certain embodiments has a dynamic (kinetic) coefficient of friction of less than 0.5 or typically less than 0.2, as measured according to the test described below in the Examples.

In addition, the outermost surface layer in certain embodiments generally has an average surface roughness Ra of less than 50 nm, as measured by Atomic Force Microscopy (AFM).

UV curable crosslinkable siloxanes employed in the present invention in certain embodiments may generally entail the use of cationic ring opening polymerization of epoxide functional groups. The epoxides react with acid generated by a UV curing catalyst such as an iodonium catalyst to form polyether crosslinks in a chain polymerization. A general discussion of the UV curing of polymer coating is the WILEY/SITA Series in Surface Coatings Technology, Chemistry & Technology of UV & EB Formulations for Coatings, Inks, & Paints. More specific material is given in Volume III of this series, *Photoinitiators for Free Radical Cationic & Anionic Photopolymerisation*, $2^{nd}$ Edition by J. V. Crivello and K. Dietliker; G. Bradley, Edt., John Wiley and Sons. The functionalized PDMS UV curable polysiloxanes are generally liquids that are readily soluble in nonpolar solvents such as tetrahydrofuran (THF). The conductive oxides employed as conductive filler particles are generally based on antimony doped tin oxides and are considered electronic conductor that carry charge independent of humidity. The tin oxide may be coated on other oxides that have various sizes and shapes and may be less expensive than the pure tin oxide core particles. These oxides disperse easily into the functionalized PDMS and form solutions that are readily coated from a slot hopper. The oxides remain well dispersed in the coating solutions and solids content can be varied over a wide range of solvent concentrations. The high solids dispersions allow for the formation of thick layers on the web of up to 500 micrometers that are free of bubbles and other defects that normally accompany the formation solution coatings. It is also possible to completely eliminate the solvents to have liquid dispersion of the polymer with the oxide and the catalyst and deposit the layer on a web.

PDMS polymers with multiple functionalized polymers along the chain allow for multiple crosslinking sites in the formation of the polymer network. Thus the level of crosslinking can be controlled by the judicious choice of the polymer or different polymers in the dispersion. ECMS-327 from Gelest, Inc. in Morrisville, Pa., USA contains 3-4 mole % of (epoxycyclohexylethyl)methylsiloxane units dispersed along the PDMS chain. The viscosity of the polymer is 650-850 centistokes. The polymer dispersions with various tin oxides are white to light gray, and are polymerized through the entire coating upon the exposure to UV light. The coatings remain white to light gray after polymerization, an important attribute because the lack of absorption allows the UV light to penetrate though the entire coating.

The electrical properties are generally independent of the siloxane binder. PDMS is a hydrophobic polymer with little water absorption regardless of humidity. The filled, crosslinked coatings would be expected to absorb some water due the hydrophilic nature of the tin oxide particles, and the poly(cyclohexane ether) crosslinks. However the level of crosslinking is relatively low in these films with the functional epoxide moiety less than 10 mole percent of the PDMS polymer. The oxides are well dispersed throughout the system and not accessible to moisture due to protection of the silicone on the oxide surface. This is borne out by electrical conductivity measurements showing little difference on free standing films stored at low and high humidity. The change in conductivity is generally less than an order of magnitude for the conductive silicone samples. In contrast, conductive urethane show more than five orders of magnitude change under the same conditions, along with a change in appearance for the urethane samples.

Crosslinking of the polymers can be either completely photolytically with UV light or combined photolytically and thermally. In one embodiment, advantageous properties were obtained by a combination of UV irradiation with the sample at 65° C. The iodonium salt catalyst generates acid under either condition. The mechanism for cationic initiation is well know and is describe in the text *UV CURE SERIES VOL 7* by J. Crivello. The iodonium salt catalyst was found to be superior to the sulfonium catalyst. This was attributed to the higher solubility of the iodonium catalyst in the PDMS polymers, which led to more efficient mixing and polymerization. This was true for both UV and thermal cure. In general films that are heated but not exposed to UV light have inferior physical properties. Insufficient curing results in decreased crosslinked density. This results in samples that were more difficult to analyze as free standing films due to the poor mechanical integrity. In general the modulus of these films could not be obtained because the samples were not tough enough to withstand the mounting for dynamic mechanical analysis.

The catalyst that is particularly useful for UV curing of these conductive siloxanes is (p-isopropyphenyl)(p-methylphenyl)iodonium tetrakis(pentafluorophenyl)borate. The crystalline solid is available commercially from Gelest, Inc. The advantage of this catalyst is thought by the inventors to be the high solubility in the silicone polymer. The structure of this catalyst is shown below.

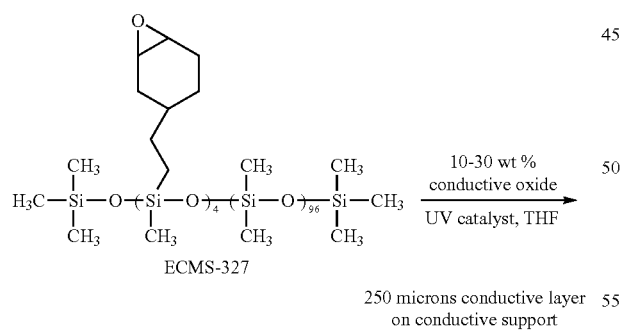

ECMS-327

250 microns conductive layer on conductive support

The level of epoxy functionalized cyclohexane is important in determining the physical properties and electrical properties. Increasing levels of crosslinking increase the modulus of the coatings. Dynamic mechanical analysis of the particle filled, crosslinked films removed from the coating show a storage modulus between 1 and 100 megapascals. The modulus and the electrical conductivity both increase with oxide loading for a particular conductive oxide. Mixing of various types of oxide particles can be use to obtain a desired combination of electrical conductivity and modulus.

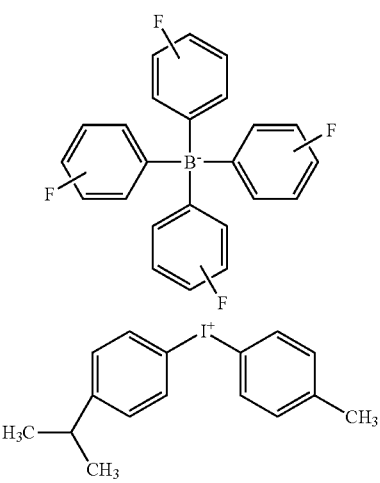

(p-isopropyphenyl)(p-methylphenyl)iodonium tetrakis(pentafluorophenyl)borate

Electrically conductive oxides based on antimony doped tin oxide are well known. These particles are available from several manufactures including Ishihara Sangyo Kaisha, Ltd. The particles are produced in different sizes and shapes. The FT Ishihara series are acicular titanium dioxide cores coated with conductive tin oxides. The acicular shape is advantageous for allowing the lowest loadings of oxide in a binder but maintaining a conductive pathway by contact. The lack of color, the FT particles are white, is advantageous for UV curing as the coating will not absorb the light on the surface, and the light will penetrate to the interior of the coating for curing of the entire layer. FT-3000 is a white acicular rutile titanium dioxide with is coated with antimony doped tin oxide. The particle size is 5.15 micrometers in length and 0.27 micrometers in diameter. The powder resistance is between 10 and 60 $\Omega$cm, according to the manufacturer. Interactions between the silicone polymers and the conductive fillers are weak and do not significantly raise the modulus of the compliant material, but instead leave it soft and pliable.

A more conductive oxide available from Ishihara is the FS series, which is also acicular for efficient contact when the particles are within a polymer binder. These are pure tin oxide particles that are doped with antimony. The small size of these particle helps to make the filler transparent to light, which is again an advantage for UV curing. The particle size for the FS-10P particles is between 0.2 and 2 micrometers in length, and 0.1 and 0.2 micrometers in diameter and are gray in color. The aspect ratio is 20-30 and powder resistivity is ≈100 $\Omega$cm, specific gravity of 6.6, and a specific surface area of 25-35 $m^2/g$, according to the manufacturer.

The ceramer used in the outermost surface layer in certain embodiments generally comprises a polyurethane silicate hybrid organic-inorganic network formed as a reaction product of a non-fluorinated polyurethane having terminal reactive alkoxysilane moieties with a tetrasiloxysilane compound. More typically, the polyurethane with terminal alkoxysilane groups is the reaction product of one or more aliphatic, non-fluorinated polyols having terminal hydroxyl groups and an alkoxysilane-substituted alkyl-substituted isocyanate compound. Suitable aliphatic polyols have molecular weights of at least 60 and up to and including 8000 and can be polymeric in composition. Polymeric aliphatic polyols can further include a plurality of functional moieties such as an ester, an ether, a urethane, a non-terminal hydroxyl, or combinations of these moieties. Polymeric polyols containing ether functions can also be polytetramethylene glycols having number average molecular weights of at least 200 and up to and including 6500, which can be obtained from various commercial sources. For example, TERATHANE-2900, -2000, -1000, and -650 polytetramethylene glycols that are available from DuPont, are useful in the reactions described above.

Polyols having a plurality of urethane and ether groups are obtained by reaction of polyethylene glycols with alkylene diisocyanate compounds having 4 to 16 aliphatic carbon atoms, such as 1,4-diisocyanatobutane, 1,6-diisocyanatohexane, 1,12-diisocyanatododecane, and isophorone diisocyanate [5-isocyanato-1-(1-isocyanatomethyl)-1,3,3-trimethylcyclohexane). The reaction mixture can also include monomeric diols and triols containing 3 to 16 carbon atoms, and the triols can provide non-terminal hydroxyl substituents that provide crosslinking of the polyurethane.

For example, a polymeric polyol can be formed from a mixture of isophorone diisocyanate, a polytetramethylene glycol having a number average molecular weight of about 2900, 1,4-butanediol, and trimethylolpropane in a suitable molar ratio.

The noted reactions are generally promoted with a condensation catalyst such as an organotin compound including dibutyltin dilaurate. The polyurethane having terminal reactive alkoxysilane moieties, is further reacted (acid catalyzed) with a tetraalkoxysilane compound to provide a ceramer useful in the present invention. The molar ratio of aliphatic polyol:alkoxysilane-substituted alkyl isocyanate is generally from about 4:1 to about 1:4, or from about 2:1 to about 1:2.

Further details about useful aliphatic hydroxyl-terminated polyols and alkoxy-substituted alkyl isocyanate compounds are described in U.S. Pat. No. 5,968,656 (noted above). This patent also shows a general network of the ceramer (Col. 5-6).

The fluorinated polyurethane ceramer coatings used in the certain embodiments of present invention are advantageous because they have a low surface energy characteristic from a fluorinated moiety incorporated into the polyurethane with the durability imparted by the inorganic phase of the ceramer. Other advantages are low coefficient of friction, non-flammability, low dielectric constant, ability to dissipate static ($<1 \times 10^{-13}$ ohm-cm), and high solvent and chemical resistance. Fluorinated ethers were incorporated into polyurethanes as described in U.S. Pat. No. 4,094,911 (Mitsch et al.).

The fluorinated polyurethane ceramer generally comprises the reaction product of a fluorinated polyurethane silicate hybrid organic-inorganic network formed as a reaction product of a fluorinated polyurethane having terminal reactive alkoxysilane moieties with a tetraalkoxysilane compound, and can be prepared by incorporating fluorinated ethers into the polyurethane backbone before it is end-capped with the isocyanatopropyltrialkoxysilane in the preparation of a polyurethane silicate hybrid organic-inorganic network as described in U.S. Pat. No. 5,968,656 (noted above) as illustrated in Scheme 1 below. In such embodiments, the polyurethane with terminal alkoxysilane groups is the reaction product of one or more fluorinated aliphatic polyols having terminal hydroxyl groups, at least one comprising a fluorinated polyol as further discussed below, optionally one or more non-fluorinated aliphatic polyols having terminal hydroxyl groups, and an alkoxysilane-substituted alkyl isocyanate compound. Suitable aliphatic polyols typically have molecular weights of about 60 to 8000 and can be polymeric. Polymeric aliphatic polyols can further include a plurality of functional moieties such as an ester, ether, urethane, non-terminal hydroxyl, or combinations thereof. Polymeric polyols containing ether functions can be polytetramethylene glycols having number-average molecular weights at least 200 and up to and including 6500, which can be obtained from various commercial sources. For example, Terathane™-2900, -2000, -1000, and -650 polytetramethylene glycols having the indicated number-average molecular weights are available from DuPont.

Polymeric polyols containing a plurality of urethane and ether groups can be obtained by reaction of fluorinated polyols and non-fluorinated polyols (such as polyethylene glycols) with alkylene diisocyanate compounds containing about 4 to 16 aliphatic carbon atoms, for example, 1,4-diisocyanatobutane, 1,6-diisocyanatohexane, 1,12-diisocyanatododecane, and, preferably, isophorone diisocyanate (5-isocyanato-1-(isocyanatomethyl)-1,3,3-trimethylcyclohexane). The reaction mixture can further include monomeric dials and triols containing 3 to about 16 carbon atoms as the triol compounds provide non-terminal hydroxyl substituents that provide branching of the polyurethane. In some embodiments, a polymeric polyol is formed from a mixture of isophorone diisocyanate, a polytetramethylene glycol having a number-average molecular weight of about 650, a fluoroalkoxy substituted polyether polyol having a number-average molecular weight of about 6300, 1,4-butanediol, and trimethylolpropane in a molar ratio of about 9:3:0.1:5:1.

Reaction of the aliphatic polyol having terminal hydroxyl groups with an alkoxysilane-substituted alkyl isocyanate compound, which can be promoted by a condensation catalyst, for example, an organotin compound such as dibutyltin dilaurate, provides a polyurethane having terminal reactive alkoxysilane moieties, which undergoes further reaction, such as an acid-catalyzed reaction, with a tetraalkoxysilane compound to provide a useful fluoroceramer. The molar ratio of aliphatic polyol:alkoxysilane-substituted alkyl isocyanate can be from 4:1 to 1:4 or more typically from 2:1 to 1:2.

Aliphatic hydroxyl-terminated polyols used in the preparation of the fluoroceramers can be of the general formula

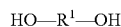

and can have molecular weights of at least 60 and up to and including 8000. As previously noted, at least one polyol is usually polymeric, and $R^1$ can include a plurality of ester, ether, urethane, and non-terminal hydroxyl groups.

The alkoxysilane-substituted alkyl isocyanate compound generally has the formula OCN—$R^2$—Si(O$R^3$)$Z^1Z^2$ wherein $R^2$ is an alkylene group having from 2 to 8 carbon atoms, O$R^3$ is an alkoxy group having 1 to 6 carbon atoms, and $Z^1$ and $Z^2$ are independently alkoxy groups having 1 to 6 carbon atoms, hydrogen, halo, or hydroxyl groups. More typically, $R^2$ has 2 to 4 carbon atoms, and O$R^3$, $Z^1$, and $Z^2$ are each alkoxy groups having 1 to 4 carbon atoms. A useful alkoxysilane-substituted alkyl isocyanate compound is 3-isocyanatopropyl-triethoxysilane.

The tetraalkoxysilane compound can be tetramethyl orthosilicate, tetrabutyl orthosilicate, tetrapropyl orthosilicate, or more typically, tetraethyl orthosilicate ("TEOS").

The hybrid organic-inorganic network of the fluoroceramer used in the outermost surface layer of the intermediate transfer member has the general structure as illustrated in Col. 5 of U.S. Pat. No. 5,968,656 wherein $R^1$ and $R^2$ are as previously defined, with the proviso that at least a portion of the $R^1$ groups include a fluorinated moiety. The hybrid organic-inorganic network includes at least 10 and up to and including 80 weight % and more typically at least 25 and up to and including 65 weight %. The fluorinated moiety in such ceramer can be conveniently obtained wherein the aliphatic hydroxyl-terminated polyol (such as a polyether diol) employed in formation of a non-fluorinated ceramer is partially replaced with the fluorinated ether to incorporate the low surface energy component into the polymer backbone. Full replacement of the aliphatic hydroxyl-terminated polyol with the fluorinated diol is generally not desirable as the surface properties do not change a great deal after the fluoropolymer accounts for more than about 20 weight % of the end capped polymer, also known as the "masterbatch."

A number of fluoroethers are available commercially that are suitable for use in this invention. In general the dihydroxy terminated fluoroalcohols are desired because they can be polymerized directly into the urethane polymer. The use of monohydroxyfluoroalcohols is not desirable because the end groups of the ceramer masterbatch should ideally contain trialkoxysilane functionality for subsequent reaction with the sol-gel precursors. The monomers should generally be diols or triols.

One class of macromers with a perfluoropolyethere chain backbone and diol end groups is FLUOROLINK D10 and D10-H available from Solvay Solexis in Italy. The same fluorocarbon structure but with the hydroxy end groups attached to ethylene oxide repeat units is also available from the same vendor as FLUOROLINK E10-H. These macromers are between 500-700 average equivalent weights.

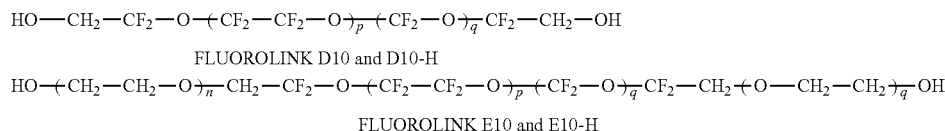

Generally higher molecular weights are desired to improve the mechanical properties of the urethane, such as ZDOLTX from Ausimont, Bussi, Italy with a number average molecular weight of 2300 and polydispersity of 1.6. Incorporation of these fluorinated blocks into polyurethanes can improve the chemical resistance and lower the coefficients of friction of thermoplastics with fluorine rich surfaces on materials with low fluorine content.

The dihydroxyfluoroethers are described in a report from the Department of Energy DOE/BC/15108-1 (OSTI ID: 750873) Novel $CO_2$-Thickeners for Improved Mobility Control Quarterly Report Oct. 1, 1998-Dec. 31, 1998 by Robert M. Enick and Eric J. Beckman from the University of Pittsburgh and Andrew Hamilton of Yale University, published February 2000 (http://www.osti.gov/bridge/servlets/purl/750873-KDMj2Z/webviewable/750873.pdf). Also described is the commercially available difunctional isocyanate terminated fluorinated ether Ausimont FLUOROLINK B. This urethane precursor has an average molecular weight of 3000 g/mol and a structure:

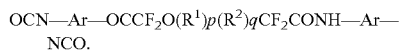

OCN—Ar—OCCF$_2$O(R$^1$)$_p$(R$^2$)$_q$CF$_2$CONH—Ar—NCO.

In these structures, R$^1$ is CF$_2$CF$_2$O, R$^2$ is CF$_2$O, and Ar is an aromatic group. In both fluorinated macromonomers, the difunctional contents are greater than 95% as characterized by NMR analysis. Ausimont describes both compounds as polydisperse.

Similar fluoroethers are also available from Aldrich Chemical, Milwaukee, Wis., USA, including multifunctional blocks. Such compounds include:

Poly(tetrafluoroethylene oxide-co-difluoromethylene oxide) á,ω-diol, HOCH$_2$CF$_2$O(CF$_2$CF$_2$O)$_x$(CF$_2$O)$_y$CF$_2$CH$_2$OH, average M$_n$≈3800;

Poly(tetrafluoroethylene oxide-co-difluoromethylene oxide) á,ω-diol bis(2,3-dihydroxypropyl ether), HOCH$_2$CH(OH)CH$_2$OCH$_2$CF$_2$O(CF$_2$CF$_2$O)$_x$(CF$_2$O)$_y$CF$_2$CH$_2$OCH$_2$CH(OH)CH$_2$OH, average M$_n$≈2000;

Poly(tetrafluoroethylene oxide-co-difluoromethylene oxide) á,ω-diol, ethoxylated HO(CH$_2$CH$_2$O)$_x$CH$_2$CF$_2$O(CF$_2$CF$_2$O)$_y$(CF$_2$O)zCF$_2$CH$_2$(OCH$_2$CH$_2$)$_x$OH, average M$_n$≈2200; and Poly(tetrafluoroethylene oxide-co-difluoromethylene oxide) á,ω-diisocyanate, CH$_3$C$_6$H$_3$(NCO)NHCO$_2$(CF$_2$CF$_2$O)$_x$(CF$_2$O)$_y$CONHC$_6$H$_3$(NCO)CH$_3$, average M$_n$≈3000.

Also suitable are POLYFOX Fluorochemicals from OMNOVA Solution INC., Fairlawn, Ohio having the following structures:

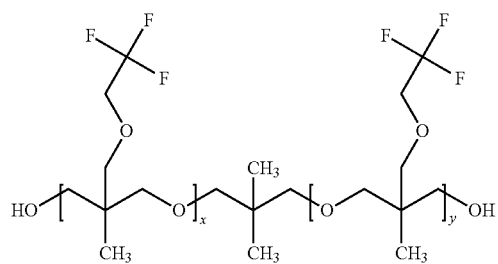

PolyFox PF-636 x+y=6
PolyFox PF-6320 x+y=20

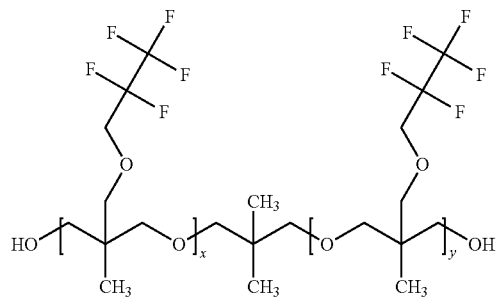

PolyFox PF-656 x+y=6
PolyFox PF-6520 x+y=20

These materials are thought to be more environmentally friendly than other fluorocarbons because these have only short fluorocarbon side chains.

The incorporation of the fluoromonomer can be represented as shown below in Scheme 1.

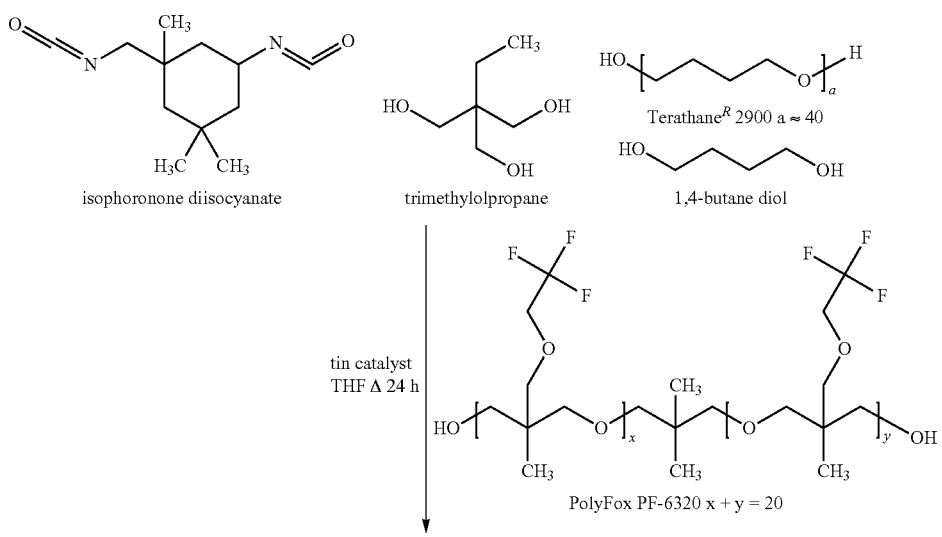

Scheme 1

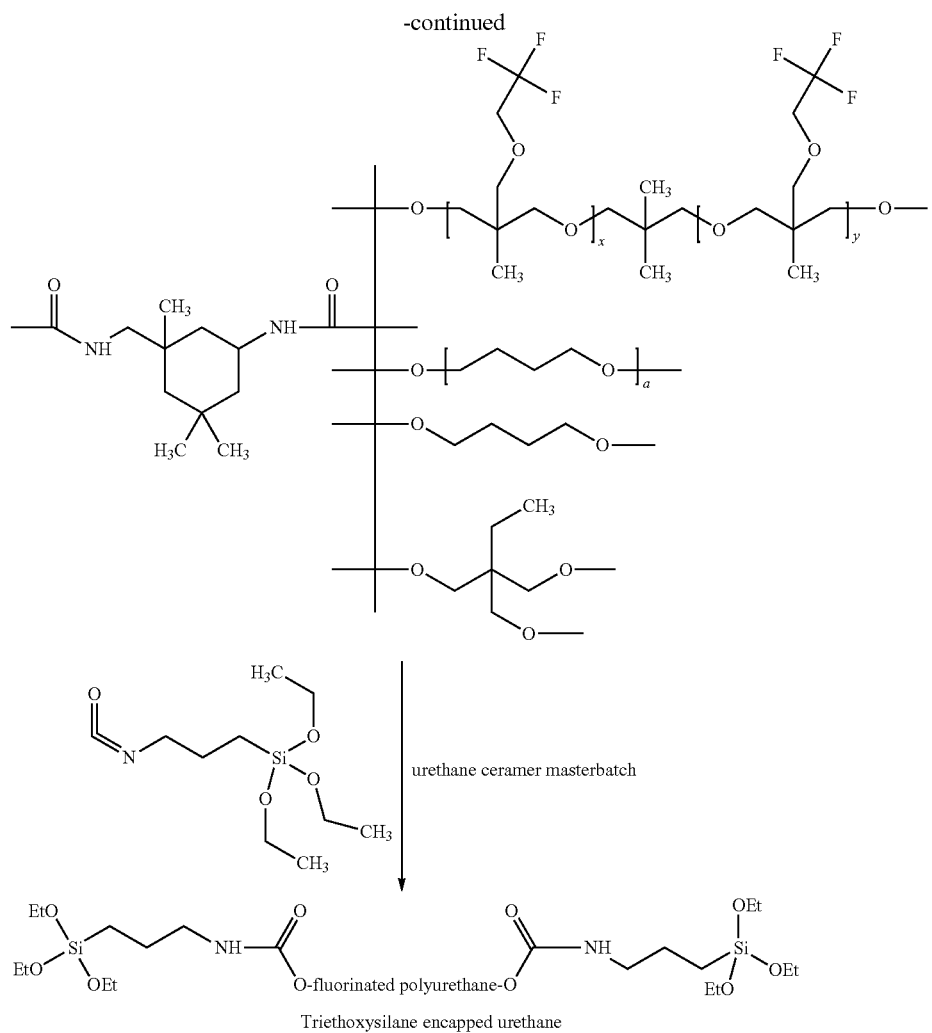

urethane ceramer masterbatch

Triethoxysilane encapped urethane

The triethoxysilane end-capped fluorinated polyurethane may be allowed to react with tetraethoxyorthosilicate (TEOS) in the presence of acid and water to hydrolyze and condense the siloxane into a silsesquioxane network. These materials may be coated and cured overnight at 80° C. to form a polyurethane silicate hybrid organic-inorganic network.

Trialkoxyfluorosilanes can also be used to introduce fluorinated alkyl groups into the fluoroceramer. The carbon-silicon bond is stable in both acid and base. These bonds are unlike the hydrolyzable silicon-oxygen of the silicon alkoxides that cleave and form the condensation products of the fluoroceramer. Thus, in the same way, the end capped fluorourethane will be incorporated into the fluoroceramer product, so too will be the fluoroalkyl moiety that is part of an alkyltrialkoxysilane. Many silanes are available commercially including nonafluorohexyltriethoxysilane, nonafluorohexyltrimethoxysilane, (heptadecafluoro-1,1,2,2-tetrahydrodecyl)triethoxysilane, and (heptadecafluoro-1,1,2,2-tetrahydrodecyl)trimethoxysilane. Additionally, more reactive groups can be used in place of the alkoxy groups. For example, both chloro and amino groups will hydrolyze from the silicon atom in the presence of alcohol or water. An example of the fluoroalkylsilane with hydrolysable chloro functionality is (heptadecafluoro-1,1,2,2-tetrahydrodecyl) trichlorosilane. The condensation of trihydroxy-substituted silicon atoms that contain an alkyl group are known as silsesquioxanes, and are sometimes represented by the formula $RSiO_{1.5}$, which would describe the product of the derivatized fluorinated urethane if TEOS is replaced with the trialkoxysilane. Mixing TEOS with the fluorinated trialkoxysilane would produce a material somewhere between a silsesquioxane and a ceramer. Additionally, a certain level of di- or monohydrolysable fluoroalkylsilane can be used to incorporate fluorinated groups into the fluoroceramer. These include heneicosafluorododecyltrichlorosilane and (heptadecafluoro-1,1,2,2-tetrahydrodecyl)methyldichlorosilane.

The ceramer or fluoroceramer preferably comprises at least 50 and up to and including 95 weight %, or typically at least 60 and up to and including 90 weight %, of the outermost surface layer. Mixtures of either or both ceramers and fluoroceramers can be used if desired.

In certain embodiments, distributed within the outermost surface layer are nanosized inorganic particles. By "nanosized", we mean the particles have an average largest dimension of at least 1 and up to and including 500 nm, or typically of at least 10 and up to and including 100 nm so that the particles disrupt the surface to a very limited extent (little effect on surface roughness), for example when the outermost surface layer has an average thickness of less than 10 μm. The small nanosized inorganic particles also provide clear coatings that are relatively transparent to light that can be an advantage for densitometry readings of toner particles on the intermediate transfer member. These particles can be present in any desirable size and shape but generally, they are essentially spherical. However, elongated, acircular, plate-like, or needle-like particles are also useful. The average particle size can be determined by light scattering and electron microscopy.

Particularly useful inorganic particles are metal oxides such as alumina or silica particles, for example spherical silica or alumina particles. Mixtures of alumina and silica particles can be used if desired. In some embodiments, the inorganic particles are triboelectrically charging metal oxide particles. Useful inorganic particles can be readily obtained from several commercial sources. Silica particles that are not agglomerated to large secondary particles are available in solvents such as water, various alcohols, and methyl ethyl ketone (MEK) that is also known as 2-butanone. These particles are available from Nissan Chemical of America in Texas as ORGANOSILICASOL colloidal silica mono-dispersed in organic solvent.

Dispersions of agglomerated alumina can also be prepared from dry powders such as gamma-alumina. These agglomerates can be broken down into nanosized inorganic particles that are stable in different solvents using various types of milling achieve different particle sizes, including ball milling and media milling. High quality gamma-alumina powders that can be milled into stable, translucent dispersions are available from Sasol of America in Houston, Tex.

In certain embodiments, the nanosized inorganic particles are preferably present in the outermost surface layer in an amount of at least 5 and up to and including 50 weight % of the total solids of the outermost surface layer. More likely, the nanosized inorganic particles are present in an amount of at least 10 and up to and including 40 weight % of the outermost surface layer.

The intermediate transfer member of this invention can be incorporated into a suitable apparatus that can be used for electrostatic or electrostatographic imaging, and the intermediate transfer member can be used to receive toner particles from a toner image carrier such as a photoconductor element and then transfer the particles to a suitable receiver element.

Such an apparatus for providing an electrostatographic image includes at least a toner-image forming unit that uses a developer containing a toner to form a toner image on a toner image carrier (such as a photoconductor), and the intermediate transfer member of this invention. Other components or stations are often present as one skilled in the art would readily understand. Representative apparatus in which the intermediate transfer member of this invention can be incorporated are described for example, in U.S. Pat. Nos. 5,666,193 (Rimai et al.), 5,689,787 (Tombs et al.), 5,985,419 (Schlueter, Jr. et al.), 5,714,288 (Vreeland et al.), 6,548,154 (Stanton et al.), 6,694,120 (Ishii), 7,728,858 (Hara et al.), and 7,729,650 (Tamaki), U.S. Patent Application Publications 2004/0247347 (Kuramoto et al.), 2009/0250842 (Okano), 2009/0074478 (Kurachi), and 2009/0074480 (Suzuki), and EP 0 747 785 (Kusaba et al.), all incorporated herein by reference to show apparatus features.

For example, the toner-image forming unit can have a charging device that produces electric charge on the toner image carrier, an exposure device that forms an electrostatic latent image on the image carrier, and a developing device that develops the electrostatic latent image with the developer containing the toner to form a toner image.

In addition, the apparatus can further comprise a receiver element device that can hold receiver elements (such as sheets of paper) to which the toner image can be transferred from the intermediate transfer member. The intermediate transfer member in this apparatus can be an endless belt.

Further, the apparatus can further comprise a fixing unit for fixing the toner image on a receiver element.

In simple terms, a toner image on a receiver element can be formed using the intermediate transfer member of this invention by:

A) forming an electrostatic latent image on an image carrier,

B) developing the latent image with a dry developer comprising toner particles to form a toner image, C) transferring the toner image to the intermediate transfer member described herein (for example an endless belt as described above), and D) transferring the toner image from the intermediate transfer member to a receiver element in the presence of an electric field that urges the movement of the toner image to the receiver element.

Dry developers that can be used in the practice of this invention are well known in the art and typically include carrier particles and toner particles containing a desired pigment. This method can further comprise fixing the toner image on the receiver element.

Referring now to FIG. 1, electrophotographic printer (EP) 2 includes a group of modules 18K, 18C, 18M, and 18Y, secondary transfer station 2a, fusing station 2b, and processor 4. Modules 18K, 18C, 18M, and 18Y are known and each contains a photoconductor for storing electrostatic charge, a charging device for depositing uniform electrostatic charge on the surface of the photoconductor, a light exposure device for creating an electrostatic latent image on the photoconductors in an imagewise fashion, and a development station for depositing toner onto the electrostatic latent image. The photoconductor in each of module 18K, 18C, 18M, and 18Y, is in nipped contact with an intermediate transfer member 12 via a backup roller for electrostatically transferring the toner from the photoconductor to the intermediate transfer member 12. Processor 4 provides necessary electrical signals to operate modules 18K, 18C, 18M, and 18Y, a high voltage AC power supply (not shown), and motor 6. Motor 6 turns drive roller 16, set of nipped transfer rollers 26a and 26b and a set of nipped fuser rollers 30a and 30b. Sheet 300 that be used in accordance with the present invention can be any receiver capable of receiving toner to form a toner image. In FIG. 1, sheet 300 is movable along sheet path 10 defined by nipped transfer rollers 26a and 26b and the nipped fuser rollers 30a and 30b, graphically illustrated by the arrows labeled 10. Negatively charged toner 22 is transferred from modules 18K, 18C, 18M, and 19Y to intermediate transfer member 12 movable along rotational transport path 8 defined by rollers 14, drive roller 16, and nipped transfer roller 26b, graphically represented by arrows labeled 8.

Negatively-charged toner 22 is then carried by intermediate transfer member 12 to secondary transfer station 2a. Negatively-charged toner 22 is electrostatically transferred to sheet 300 as it passes through nipped transfer rollers 26a and 26b. Charged sheet 300 is then passed through fusing station 2b located after secondary transfer station 2a. Fusing station 2b has nipped fusing rollers 30a and 30b that apply heat and pressure to charged sheet 300 to fuse or fix negatively-charged toner 22 to charged sheet 300. Upon exiting fusing station 2b, charged sheet 300 has untoned side 300a and toned side 300b.

The compliant layers of this invention produced by the UV cure of epoxy silicones filled with conductive tin oxides are soft, compliant materials. They are highly crosslinked through the epoxy groups to form polyethers. When filled with conductive oxides between 10 and 40 wt %, they dissipate charge. The static charge dissipation is not dependent on humidity because the silicone polymers do not absorb water at high humidity, and the charge dissipation mechanism is electronic, not ionic as in many charge dissipative materials. It is also advantageous that these layers are a light grey in color allowing of efficient curing of the coated layer with UV lamps. Further, it is an advantage that the formulations are of low viscosity before they are cured, allowing of easy coating onto substrates. Low levels of solvents such a THF allow for coatings with low solvent emissions. Low levels of solvents such as THF means that conductive substrates such as polycarbonate that are inherently sensitive to non-polar solvents can be used with these high solid conductive siloxane formulations. The low viscosity of the functionalized siloxane conductive oxide formulations allows for formulations to be prepared with no solvent. These dispersions can be coated through a slot dye on a solvent coater or on an extrusion coater. When overcoated with release layers such as ceramers and especially fluoroceramers, transport webs of these silicone compliant layers maintain their low coefficient of friction across many environments when placed against a photoconductor.

EXAMPLES

Materials

Poly(vinyl butyral) was BH-6 ($9.2 \times 10^4$ molecular weight; 69+/−3 mole % butyral content) was obtained from Sekisui Products LLC, Troy, Mich.

Epoxyfunctional PDMS polymers were obtained from Gelest, Inc., Tullytown, Pa., USA. ECMS-327 is EpoxycyclohexylethylMethylsiloxane-Dimethylsiloxane copolymer, Viscosity 650-850 cps, molecular weight 18,000-20,000, 3-4 mole % EpoxycyclohexylethylMethylsiloxane.

ECMS-924 is EpoxycyclohexylethylMethylsiloxane-Dimethylsiloxane copolymer, Viscosity 300-450 cps, molecular weight 10,000-12,000, 8-10 mole % EpoxycyclohexylethylMethylsiloxane from Gelest, Inc., Tullytown, Pa., USA.

OMBO037 (p-isopropylphenyl)(p-methylphenyl)iodonium tetrakis(pentafluorophenyl)borate is a UV initiator for cationic polymerizations from Gelest, Inc., Tullytown, Pa., USA.

FS-10P is a transparent acicular SnO2 (Sb doped) from Ishihara Sangyo Kaisha, Ltd.

FT-3000 is a white acicular rutile titanium dioxide with is coated with antimony doped tin oxide from Ishihara Sangyo Kaisha, Ltd.

Static-dissipative polyurethane was obtained from Lubrizol as E1150™.

Static-dissipative polycarbonate roll of film was obtained from Gunze (Japan). The 100 μm thick substrate was black because of dispersed carbon.

Primer Formulation

A 4% primer solution of poly(vinyl butyral) was prepared by adding BH-6 (4 g) from Sekisui to 3A alcohol (196 g) stirred with a mechanical stirrer and heated to 90° C. for 2 hours.

Compliant Layer 1 Formulation

ECMS-327 (119.0 g) and ECMS-924 (329.0 g) cyclohexylepoxysiloxanes were mixed in a jar with THF (93.8 g) using a magnetic stirrer. FT-3000 (77.0 g) and FS-10P (35.0 g) conductive oxides were added to the stirred solution, the stir bar removed, and the dispersion milled with a Silverson L4R mixer for 10 minutes. The photoacid catalyst OMBO037 (17.92 g) was dissolved in THF (46.2 g) and added to the milled polymer-oxide dispersion.

Compliant Layers 2-7 Formulations

Additional compliant layers were made following the procedure for Compliant Layer 1, with the amounts of the components given in Table 1.

TABLE 1

Formulation of Silicone Compliant Layer

| Compliant Layer | ECMS-327 (g) | ECMS-924 (g) | FT-3000 (g) | FS-10P (g) | THF (total) (g) | OMBO037 |
|---|---|---|---|---|---|---|
| 1 | 119.0 | 329.0 | 77.0 | 35.0 | 140 | 17.92 |
| 2 | 119.0 | 329.0 | 77.0 | 35.0 | 140 | 17.92 |
| 3 | 79.688 | 220.3 | 51.6 | 23.4 | 125 | 12.0 |
| 4 | 80.750 | 223.3 | 52.3 | 23.8 | 95 | 12.12 |
| 5 | 81.281 | 224.7 | 52.6 | 23.9 | 67.5 | 12.24 |
| 6 | 119.5 | 330.5 | 77.3 | 35.2 | 187.5 | 18.0 |
| 7 | 119.0 | 329.0 | 77.0 | 35.0 | 140 | 17.92 |

Fluoroceramer Overcoat Formulations

10 Weight % Fluoroceramer Masterbatch: To a 500 ml, three-neck round bottom flask containing dry tetrahydrofuran (THF) (150 ml) under nitrogen were added TERATHANE 650 polytetramethylene glycol (19.45 g, 0.030 mol), 1,4-butanediol (4.25 g, 0.047 mol), POLYFOX PF-6320 surfactant (5.36 g, 0.0014 mol) and trimethylolpropane (1.30 g, 0.010 mol). The resulting mixture was stirred under nitrogen until a solution was obtained and then isophorone diisocyanate (19.64 g, 0.088 mol) was added, and the mixture was degassed under reduced pressure (0.1 mm Hg). Dibutyltin dilaurate (0.10 g, 0.0002 mol) was added, and the resulting mixture was heated at 60° C. under nitrogen for 5 hours. To this solution, were added 3-isocyanatopropyl-triethoxysilane (4.04 g, 0.0081 mol) and additional THF (35 ml). The mixture was heated at 60° C. for 15 hours, yielding a solution containing 24 weight % dissolved solids.

Fluoroceramer 6: 10 Weight % Fluorinated Ceramer with 0.37 TEOS/polymer and 0.37 MEK-ST silica. To a stirred, glass jar previously charged with the ORGANOSILICASOL IPA-ST (8.94 g), isopropyl alcohol (16 ml), and 0.15 N triflic acid (6.15 ml) were added the 10 weight % Fluorinated Masterbatch (45 g) that had been previously diluted with isopropanol (40 ml) followed by dropwise addition of TEOS (15.89 g). The solution was stirred at room temperature for 48 hours, after which SILWET L-7002 (1.55 g of a 10 weight % solution in IPA) was added. The solution was stirred overnight and diluted with IPA to 7 weight % solids before coating.

Fluoroceramer 7: 10 Weight % Fluorinated Ceramer with 1.47 TEOS/polymer and 1.47 MEK-ST silica. To a stirred, glass jar previously charged with the ORGANOSILICASOL MEK-ST (39.7 g), isopropyl alcohol (18 ml), and 0.15 N triflic acid (6.84 ml) were added the 10 weight % Fluorinated Masterbatch (50 g) that had been previously diluted with isopropanol (40 ml) followed by dropwise addition of TEOS (17.7 g,). The solution was stirred at room temperature for 48 hours, after which SILWET L-7002 (1.55 g of a 10 weight % solution in IPA) was added. The solution was stirred overnight and diluted with IPA to 7 weight % solids before coating.

Comparative Example Fluoroceramers Formulations 2-6: Additional formulations were made following the procedure for Fluoroceramer Overcoat Formulation 6 and 7, with the component amounts given in Table 2.

TABLE 2

Fluoroceramer Overcoat Formulation

|  | Fluoro-ceramer or ceramer master-batch (g) | TEOS (g) | initial IPA (mL) | additional IPA (mL) | IPA-ST dispersion (g) | MEK-ST dispersion (g) | triflic acid (mL) | Measured overcoat thickness (Micrometers) |
|---|---|---|---|---|---|---|---|---|
| Exam 6 | 45 | 15.89 | 40 |  | 8.94 | NA | 6.15 | NA |
| Exam 7 | 50 | 7.66 | 8 + 40 | 80 | NA | 39.73 | 6.84 | 4.7 |
| Comp 2 | 45 | 11.92 | 38 + 40 | 80 | 11.92 | NA | 6.15 | 2.6 |
| Comp 3 | 43.73 | 15.44 | 38 + 40 | 100 | NA | 34.74 | 5.98 | 3.7 |
| Comp 4 | 50 | 17.66 | 38 + 40 | 80 | NA | 39.73 | 6.84 | 1.9 |
| Comp 5 | 50 | 13.24 | 38 + 40 | 80 | 13.24 | NA | 6.84 | 1.8 |
| Comp 6 | 50 | 35.31 | 38 + 40 | 40 | NA | 39.73 | 6.84 | 3.2 |

Example 1

Compliant layer 1 was coated, using an extrusion hopper, on one side of a 102 μm-thick polyethylene terephthalate film and dried at 71° C. before exposure to ultraviolet radiation, followed immediately by further drying up to 93° C., the entire process taking 20-30 minutes. The light gray layer was peeled from the support to give soft free standing films of approximately 100 micrometers in thickness. One film was equilibrated at 15% RH for several days and another film at 100% RH for the same period.

Example 2

Compliant layer 2 was coated in the same way as for Example 1, except the UV lamp was not used and the sample was cured thermally only. The film was dried at temperatures up to 93° C. over a period of 20-30 minutes. The light gray layer was peeled from the support to give soft free standing films of approximately 100 micrometers in thickness. One film was equilibrated at 15% RH for several days and another film at 100% RH for the same period.

Example 3

Compliant layer 1 was coated, using an extrusion hopper, on one side of a 102 μm-thick polyethylene terephthalate film and dried at 121° C. before exposure to ultraviolet radiation, followed immediately by further drying up to 93° C., the entire process taking 20-30 minutes. The light gray layer was peeled from the support to give soft free standing films of approximately 80 micrometers in thickness. One film was equilibrated at 15% RH for several days and another film at 100% RH for the same period.

Example 4 and Example 5

Compliant layers 4 and 5 were coated, using an extrusion hopper, on one side of a 102 μm-thick polyethylene terephthalate film and dried at 121° C. before exposure to ultraviolet radiation, followed immediately by further drying up to 93° C., the entire process taking 20-30 minutes. The light gray layer was peeled from the support to give soft free standing films of approximately 100 micrometers in thickness. One film of each was equilibrated at 15% RH for several days and another film at 100% RH for the same period.

Example 6

The polyvinyl butyral) primer was coated, using an extrusion hopper, over a static-dissipative polycarbonate substrate obtained from Gunze (Japan). The 100 μm thick substrate was black because of dispersed carbon. The coating was dried at temperatures up to 180° C. for 20-30 minutes.

Compliant layer 6 was coated over the primer layer using an extrusion hopper and dried at 71° C. before exposure to ultraviolet radiation, followed immediately by further drying up to 93° C., the entire process taking 20-30 minutes. The light gray layer was approximately 120 micrometers in thickness.

Fluoroceramer 6 was coated over the compliant layer using an extrusion hopper and dried up to 121° C., the entire process taking 20-30 minutes. The overcoat was cured by heating the film in an oven at 80° C. for 24 hours. The overcoat was approximately 4 micrometers in thickness.

Example 7

The poly(vinyl butyral) primer was coated, using an extrusion hopper, over a static-dissipative polycarbonate substrate obtained from Gunze (Japan). The 100 μm thick substrate was black because of dispersed carbon. The coating was dried at temperatures up to 180° C. for 20-30 minutes.

Compliant layer 7 was coated over the primer layer using an extrusion hopper and dried at 71° C. before exposure to ultraviolet radiation, followed immediately by further drying up to 93° C., the entire process taking 20-30 minutes. The light gray layer was approximately 120 micrometers in thickness.

Fluoroceramer 7 was coated over the compliant layer using an extrusion hopper and dried up to 121° C., the entire process taking 20-30 minutes. The overcoat was cured by heating the film in an oven at 80° C. for 24 hours. The fluoroceramer overcoat layer was 4.7 micrometers in thickness as measured by optical cross-section.

Example 8

Figure 2:
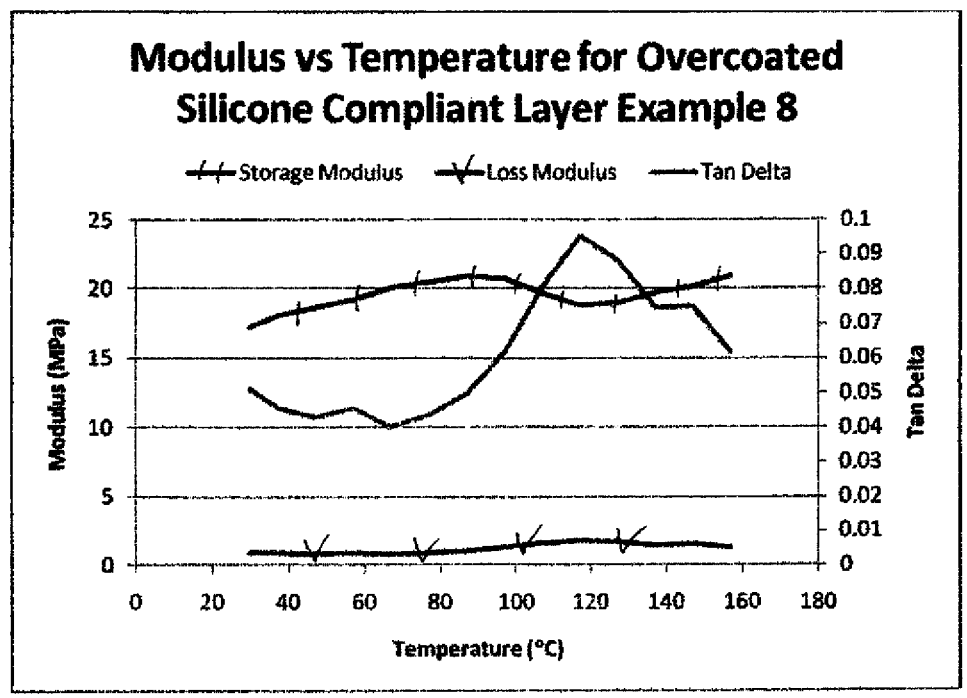
FIG. 2 is the plot of the storage and loss modulus and the resulting tan delta for the compliant silicone layer overcoated with fluoroceramer.

This sample was made in the same way as Example 7 except it was coated on unsubbed PET as a substrate without primer layer to allow removal of the coating for dynamic mechanical analysis (DMA). The freestanding film of the UV crosslinked silicone compliant layer with the fluoroceramer overcoat is shown in FIG. 2. The plot shows that the compliant layer has a storage modulus below 20 MPa at 40° C. and remains fairly constant as the temperature is increased. This is in contrast to other samples that received only thermal cures and were not exposed to UV curing. Those samples showed large changes in modulus as the temperature was increased, indicating a high degree of curing was taking place during the analysis.

Comparative Example 1

Coatings were prepared on a roll of static-dissipative polycarbonate substrate obtained from Gunze (Japan). The 100 µm thick substrate was black because of dispersed carbon. A 200 µm thick layer of static-dissipative polyurethane E1150 from Lubrizol was extruded onto the polycarbonate to form a compliant layer. The polyurethane-coated polycarbonate had a durometer reading of about 60 MPa.

Comparative Example 2

The urethane compliant layer from comparative Example 1 was used as a substrate for coating of the fluoroceramer. The polyurethane-coated polycarbonate had a durometer reading of about 60 MPa. The fluoroceramer coatings were then coated onto the polyurethane-coated polycarbonate using a roll-roll coating machine and dye slot coating head and 5 dryers through which the outermost coated web was transported to remove solvent and initiate curing of the fluoroceramer. Upon completion of fluoroceramer coating, the resulting web was unwound and placed in an 80° C. oven for 24 hours to complete curing.

Comparative Examples 3-6

Additional comparative examples were made in the same manner as Comparative Example 2, except the fluoroceramer overcoat formulations were prepared as outlined in Table 2.

Electrical Resistivity Under Low and High Humidity

The data in Table 3 below shows that epoxy crosslinked silicone compliant layers are more electrically stable than urethane layer to humidity changes. DC resistivity measurements were made on the free standing films of the silicone compliant layers that were removed from the unsubbed PET for Examples 1-5. The samples were conditioned either at 100% RH or 15% RH for several days. The reading were made using a Keithley 6517A with Monroe circular electrodes (A=7.1 cm2) held at 100 V for 30 seconds. The results in Table 3 show there was little difference between the conductive silicone sample stored at low and high humidity. This is represented in the last column that shows the resistivity at low humidity divided by the resistivity at high humidity, $\rho 15\%/\rho 100\%$. The ratio for the silicone samples did not exceed the value of 2, indicating that the resistivity at low humidity was not greatly different than the resistivity at high humidity. All of the readings for the silicone samples were in the $10^{10}$ or $10^{11}$ ohm-cm range.

The conductive urethane of Comparative Example 1 showed a much larger change in resistivity between low and high humidity. The resistivity was $1 \times 10^{10}$ ohm-cm for the sample at low humidity and $3 \times 10^{7}$ ohm-cm for the samples at high humidity. This gives a value of 404 for $\rho 15\%/\rho 100\%$. The conductive urethane shows a much greater change in resistivity with environment than does the silicone used in the compliant layers of this invention.

TABLE 3

Difference in Resistivity of Urethane and Silicone Compliant Layers

| Example | Thick (um) | R at 100% (Mohm) | R at 0% (Mohm) | ρ100% (ohm-cm) | ρ15% (ohm-cm) | ρ15%/ ρ100% |
|---|---|---|---|---|---|---|
| Comp 1 | 500 | 0.192 | 77.6 | 2.73E+07 | 1.10E+10 | 404.17 |
| 1 | 97 | 50 | 54 | 3.66E+10 | 3.95E+10 | 1.08 |
| 2 | 102 | 51 | 97 | 3.55E+10 | 6.75E+10 | 1.90 |
| 3 | 75 | 183 | 200 | 1.73E+11 | 1.89E+11 | 1.09 |
| 4 | 121 | 171 | 279 | 1.00E+11 | 1.64E+11 | 1.63 |
| 5 | 119 | 211 | 359 | 1.26E+11 | 2.14E+11 | 1.70 |

Coefficient of Friction of Compliant Silicone Layers at High Humidity.

The fluoroceramer coatings were analyzed for coefficient of friction using a 200 g weighted sled wrapped with each coating, and pulling the sled over a sheet of photoconductor that had been placed on a vacuum platen. A load cell was used to measure the force needed to move the fluoroceramer coating against the photoconductor, the results were recorded using a computer, and the static and dynamic coefficients of friction were calculated. A graph was generated during the experiments to eliminate samples where the sled 200 g weight would leap or jump because of a stick-slip type of friction.

Silicone compliant layer coated with fluoroceramer had low coefficient of friction at high humidity. Experiments were conducted in a high humidity chamber with fluoroceramer-silica against photoreceptor to determine if the coefficient of friction increases as a function of humidity in Examples 6 and 7. The fluoroceramer on E1150 polyurethane was tested against photoreceptor film in Comparative Examples 2-6. These examples and comparative examples generally have COF between 0.3-0.4 at ambient conditions. The results of the measurements of COF at high humidity are shown in Table 4.

The first set of results was obtained after the sample had been in a 70° F./70% RH chamber over the weekend (72 hours). Only one of urethane compliant layer samples (Comparative Example 2) could be measured and it had increased to 1.4 for the kinetic COF. The other samples with urethane compliant layers could not be run due to sticking of the CITW to the photoreceptor. The results were repeated with fresh samples that were in the chamber overnight (16 hours). Again the same sample had a measurable COF of 0.6. The other samples could not be measured as the COF was too high.

The fluoroceramer on the silicone compliant layer is less affected by the high humidity. This is also true for the electrical resistivity of the silicone samples compared to the E1150 urethane, probably because the silicone absorbs less water than the urethane. The layer underneath may affect the COF. The kinetic COF stayed below 0.3 regardless of the humidity under which the test were run.

TABLE 4

Coefficient of Friction of Overcoated Compliant Layers at High Humidity.

| | | COF 16 hours at 70/70 | | COF 72 hours at 70/70 | | COF 5 days at 70/70 | |
|---|---|---|---|---|---|---|---|
| Example | Description | Static | Kinetic | Static | Kinetic | Static | Kinetic |
| comp 2 | fluorocer/E1150 | 0.7 | 0.6 | 1.6 | 1.4 | NA | NA |
| comp 3 | fluorocer/E1150 | NA | NA | jumped | jumped | jumped | jumped |
| comp 4 | fluorocer/E1150 | jumped | jumped | jumped | jumped | NA | NA |
| comp 5 | fluorocer/E1150 | jumped | jumped | jumped | jumped | NA | NA |
| comp 6 | fluorocer/E1150 | jumped | jumped | jumped | jumped | NA | NA |
| 6 | fluorocer/silicone | 0.4 | 0.3 | | | 0.3 | 0.2 |
| 7 | fluorocer/silicone | 0.5 | 0.3 | | | 0.4 | 0.3 |

Imaging of belts with Silicone Intermediate Transfer Layers

The coatings of the primer, silicone compliant layer, and fluoroceramer on the conductive polycarbonate were flexible films that were formed into loops with the coating on the outside of the loop. The characterization of Examples 6 and 7 as intermediate transfer members (belts) were carried out in a modified Kodak DIGIMASTER printer. The images produced were of high quality.

The invention claimed is:

1. An intermediate transfer member comprising:
a static dissipative polymeric substrate, a cured static dissipative silicone compliant layer, and an outermost surface ceramer layer formed over the cured static dissipative silicone compliant layer,
(1) wherein the cured static dissipative silicone compliant layer comprises a crosslinked silicone polymer formed from a UV light curable siloxane comprising ether forming epoxy functionalized polycyclohexane crosslinked silicone and (p-isopropylphenyl)(p-methylphenyl)iodonium tetrakis(pentafluorophenyl)borate UV photoacid catalyst,
(2) wherein the cured static dissipative silicone compliant layer includes inorganic particles of acicular electroconductive oxides present in an amount of at least 15 weight % to 30 weight % of the crosslinked silicone polymer, which electroconductive oxides consist of:
inorganic particles of acicular titanium dioxide coated with tin oxide doped with antimony and having a particle size of 5.15 µm length and 0.27 µm diameter, with a powder resistivity of 10-60 ohm-cm, and
inorganic particles of acicular electroconductive tin oxide doped with antimony and having a particle size of 0.2 to 2 µm length and 0.1 to 0.2 µm diameter, with a powder resistivity of 100 ohm-cm, and
the weight ratio of the acicular titanium dioxide particles coated with tin oxide doped with antimony to the acicular electroconductive tin oxide particles doped with antimony is 2.2, and
(3) wherein the cured static dissipative silicone compliant layer has a DC volume resistivity in the range of $10^{10}$ to $10^{11}$ ohm-cm, where its resistivity at 15% relative humidity divided by its resistivity at 100% relative humidity has a ratio not exceeding the value of 2, and wherein the epoxy functionalized polycyclohexane crosslinked silicone comprises a mixture of:
A) epoxycyclohexylethylmethylsiloxane-dimethylsiloxane copolymer with 3 to 4 mole % of epoxycyclohexylethylmethylsiloxane, a viscosity of 650 centipoise to 850 centipoise, and a molecular weight of 18,000 to 20,000, and
B) epoxycyclohexylethylmethylsiloxane-dimethylsiloxane copolymer having 8 to 12 mole % of epoxycyclohexylethylmethylsiloxane, a viscosity of 300 centipoise to 450 centipoise, and a molecular weight of from 10,000 to 12,000,
in a weight ratio of 0.36.

2. The intermediate transfer member of claim 1, wherein the ceramer layer comprises a fluoroceramer.

3. The intermediate transfer member of claim 2, wherein the ceramer layer consists essentially of a non-particulate, non-elastomeric fluoroceramer and nanosized inorganic particles that are distributed within the non-particulate fluoroceramer in an amount of at least 5 and up to and including 50 weight % of the outermost surface layer.

4. The intermediate transfer member of claim 1 that is an endless belt.

5. The intermediate transfer member of claim 1 wherein the cured static dissipative silicone compliant layer has a thickness of at least 50 µm and up to and including 500 µm.

6. The intermediate transfer member of claim 1 wherein the cured static dissipative silicone compliant layer has a thickness of at least 80 µm and up to and including 400 µm.

7. The intermediate transfer member of claim 1 wherein the cured static dissipative silicone compliant layer has a storage modulus of at least 1 and up to and including 100 MPa at 40° C.

8. The intermediate transfer member of claim 1 wherein the cured static dissipative silicone compliant layer has a storage modulus of at least 5 and up to and including 50 MPa at 40° C.

* * * * *